US009829139B2

(12) United States Patent
Stavrou (10) Patent No.: US 9,829,139 B2
(45) Date of Patent: Nov. 28, 2017

(54) METHOD OF DAMPENING PRESSURE PULSATIONS IN A WORKING FLUID WITHIN A CONDUIT (71) Applicant: Robert Bosch GmbH, Stuttgart (DE)

(72) Inventor: Paul C. Stavrou, Slatington, PA (US)

(73) Assignee: Robert Bosch GmbH, Stuttgart (DE)

( * ) Notice: Subject to any disclaimer, the term of this patent is extended or adjusted under 35 U.S.C. 154(b) by 352 days.

(21) Appl. No.: 14/626,607

(22) Filed: Feb. 19, 2015

(65) Prior Publication Data
US 2016/0245267 A1 Aug. 25, 2016

(51) Int. Cl.
*F16L 55/033* (2006.01)
*F04B 11/00* (2006.01)
(Continued)

(52) U.S. Cl.
CPC ............ *F16L 55/033* (2013.01); *F04B 11/00* (2013.01); *F04B 11/0058* (2013.01); *F15B 3/00* (2013.01); *F15B 21/12* (2013.01); *F16L 55/05* (2013.01)

(58) Field of Classification Search
CPC ... F04B 11/00; F04B 11/0008; F04B 11/0016; F04B 11/0058; F15B 1/00; F15B 2201/00; F15B 2201/515; F15B 3/00; F15B 21/12; F15B 2201/51; F15B 1/021; F16L 55/033; F16L 55/05
(Continued)

(56) References Cited
U.S. PATENT DOCUMENTS 4,308,095 A 12/1981 Brendemuehl
4,735,687 A 4/1988 Pfalzer et al.
(Continued)

FOREIGN PATENT DOCUMENTS

DE 102005012834 9/2006
DE 102005058547 6/2007
(Continued)

OTHER PUBLICATIONS

European Patent Office Search Report for Application No. 16151787.5 dated Jul. 22, 2016 (7 pages).
(Continued)

*Primary Examiner* — Bryan Lettman
*Assistant Examiner* — Charles W Nichols
(74) *Attorney, Agent, or Firm* — Michael Best & Friedrich LLP (57) ABSTRACT A method is provided for actively compensating for pressure changes of a working fluid within a conduit. A first cavity is provided in fluid communication with the conduit. A second cavity is in fluid communication with a control fluid. A plunger is in communication with both the first cavity and the second cavity and is movable in response to pressure changes of the working fluid in the conduit. The plunger is re-centered. Re-centering the plunger includes the following steps. Position data representative of movement of the plunger is collected. The position data is analyzed with a control unit to determine an average position of the plunger which is offset relative to a center position. The average position of the plunger is compared, with a control unit, to the center position. A signal is relayed from the control unit to a control valve to urge the plunger toward the center position.

7 Claims, 6 Drawing Sheets (51) Int. Cl.
*F15B 3/00* (2006.01)
*F15B 21/12* (2006.01)
*F16L 55/05* (2006.01)

(58) Field of Classification Search
USPC ............ 417/540; 60/459, 469; 91/1; 92/5 R; 138/31
See application file for complete search history.

(56) References Cited

U.S. PATENT DOCUMENTS

| | | |
|---|---|---|
| 4,750,523 A | 6/1988 | Crouse |
| 5,785,815 A | 7/1998 | Munch |
| 5,797,430 A | 8/1998 | Becke et al. |
| 6,308,516 B1 | 10/2001 | Kamada |
| 7,905,713 B2 * | 3/2011 | Hofmann ................ F04B 9/113 417/521 |
| 8,613,224 B2 | 12/2013 | Kurtz et al. |
| 8,777,335 B2 | 7/2014 | Furuyama |
| 2011/0302976 A1 * | 12/2011 | Keintzel ................ B21B 37/00 72/13.3 |
| 2012/0000543 A1 * | 1/2012 | Keintzel ................ F15B 21/008 137/12 |
| 2012/0152360 A1 | 6/2012 | Marica |

FOREIGN PATENT DOCUMENTS

| | | |
|---|---|---|
| EP | 0679832 | 11/1995 |
| GB | 1450473 | 9/1976 |
| JP | H04119291 | 4/1992 |

OTHER PUBLICATIONS

European Patent Office Extended Search Report for Application No. 16151787.5 dated Jan. 3, 2017.

* cited by examiner

METHOD OF DAMPENING PRESSURE PULSATIONS IN A WORKING FLUID WITHIN A CONDUIT

BACKGROUND OF THE INVENTION

Hydraulic applications are applications which include movement of a working fluid which is pressurized relative to ambient pressure. These applications include petrochemical or chemical processing, oil refinement, and hydraulically operated implements (e.g., vehicle braking systems, hydraulic jacks, garbage compactors, pneumatic drills, etc.) among others. Working fluids, also known as process fluids, are typically chemical solutions, oils or other petroleum products, water or water based solutions, as well as other liquid materials. In many hydraulic applications, a steady fluid pressure is required to satisfy the needs of the application process. Unwanted pressure fluctuations often occur in these working fluids due to process variables, pumping inconsistencies, and valve actuation.

In known hydraulic applications, such as the ones mentioned above, an accumulator is used to dampen the pressure fluctuations. An accumulator can include a plunger located within a chamber and in fluid communication with the working fluid. The plunger is biased towards the working fluid by a biasing member (e.g., a compressible gas, a spring, etc.). The biasing member compresses and expands in response to the pressure fluctuations, thereby dampening the fluctuations within the working fluid. However, these accumulators must be adjusted to the average pressure of the process fluid. Additionally, many accumulators do not offer a constant compensation pressure due to the characteristics of springs and compressed gasses. As such, the effectiveness of these accumulators is reduced with large pressure fluctuations and may not satisfy the requirements of a constant pressure process.

SUMMARY OF THE INVENTION

The invention provides, in one aspect, a method for actively compensating for pressure changes of a working fluid within a conduit. A first cavity is provided in fluid communication with the conduit. A second cavity is in fluid communication with a control fluid. A plunger is in communication with both the first cavity and the second cavity and is movable in response to pressure changes of the working fluid in the conduit. The flow of the control fluid into and out of the second cavity is controlled with a control valve. The plunger is re-centered to maximize the plunger travel available for compensation of pressure changes of the working fluid in the conduit. Re-centering the plunger includes the following steps. Position data representative of movement of the plunger is collected over an elapsed time period. The position data is analyzed with a control unit to determine an average position of the plunger which is offset relative to a center position in which available plunger displacement is equal in both directions. The average position of the plunger is compared, with a control unit, to the center position. A re-centering signal is relayed from the control unit to a control valve to urge the plunger toward the center position.

The invention provides, in another aspect, a method of dampening pressure pulsations in a working fluid within a conduit. A first cavity is provided in fluid communication with the conduit. A second cavity is provided in fluid communication with a control fluid source and a control valve and separated from the first cavity by a plunger. A first component of a pressure fluctuation within the conduit is identified by comparing an average working fluid pressure measured with a pressure sensor in the conduit to a pressure measured with a pressure sensor in the second cavity. A second component of the pressure fluctuation is identified with the pressure sensor in the conduit. The second component of the pressure fluctuation has a higher frequency than the first component of the pressure fluctuation. A first signal indicative of the first component of the pressure fluctuation is relayed to the control unit. A second signal indicative of the second component of the pressure fluctuation is relayed to a control unit. A single cumulative output is sent from the control unit to actuate the control valve to simultaneously dampen both the first component of the pressure fluctuation and the second component of the pressure fluctuation.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
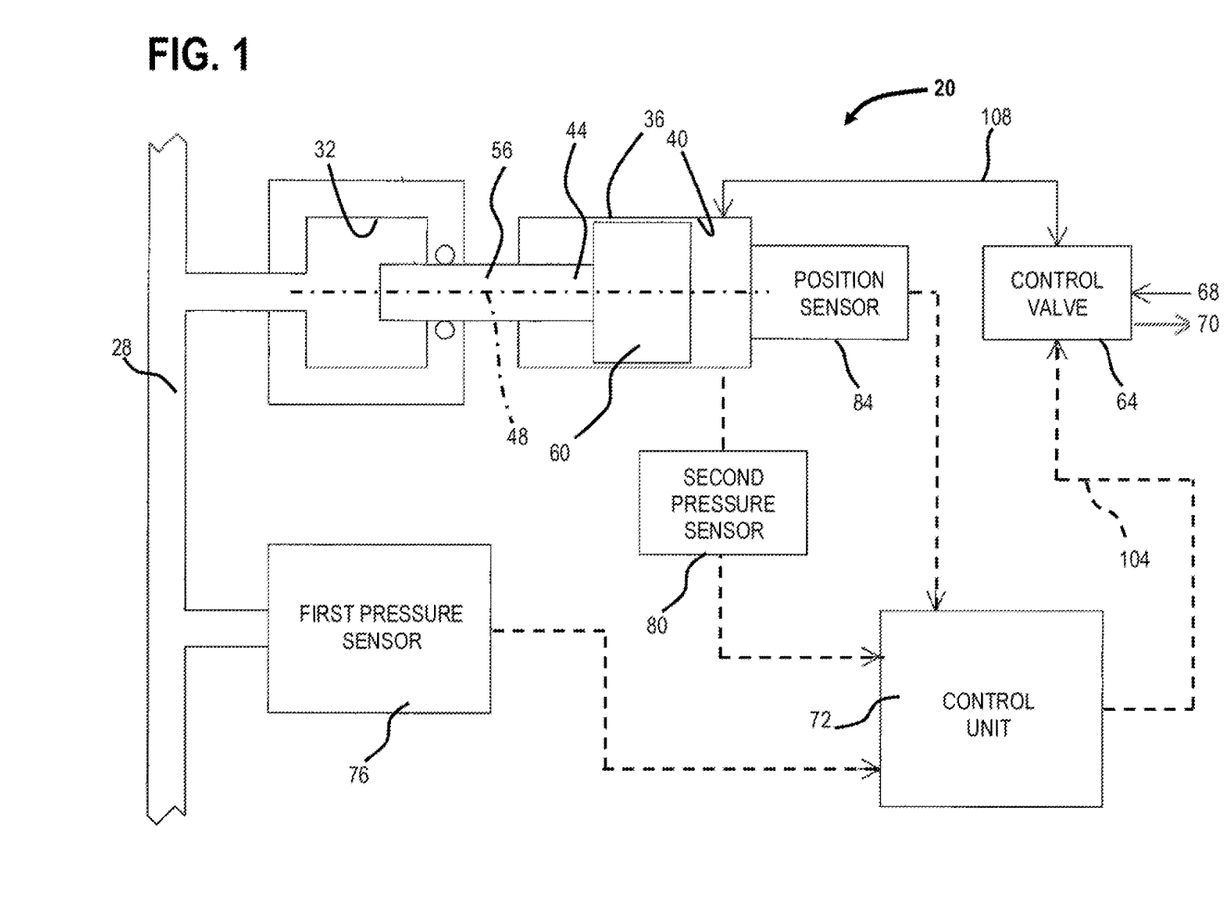
FIG. 1 is a schematic diagram of a dampening system for a working fluid within a conduit.

A dampening system 20 for suppressing pressure fluctuations of a working fluid, such as the one shown in FIG. 1, is fluidly connected to a conduit 28 for conveying a working fluid through, to, or from a hydraulic application (not shown). As shown, the conduit 28 is a pipe; however, the conduit 28 may be otherwise embodied as a tank or any alternative structure which experiences a pressure fluctuation within the working fluid. Working fluids, also known as process fluids, are typically chemical solutions, oils or other petroleum products, water or water based solutions, as well as other non-compressible liquid materials. The working fluid may be a part of various applications (e.g., chemical or petrochemical processing, oil refinement, vehicle braking systems, hydraulic jacks, etc.). Pressure fluctuations often occur in these working fluids due to process variables, pumping inconsistencies, and valve actuation.

The dampening system 20 includes a control chamber or first cavity 32 that is in fluid communication with the conduit 28. The working fluid within the conduit 28 fills the first cavity 32, which is in direct fluid communication with the conduit 28. The first cavity 32 is operatively coupled to a hydraulic actuator 36 through a plunger 44. The volume of the first cavity 32 is variant by translating the plunger 44 along an axis 48, the plunger 44 partially delimiting the first cavity 32. The hydraulic actuator 36 defines a second cavity 40 separate from the working fluid and having a variable volume. The second cavity 40 is filled with a control fluid. The volume of the second cavity 40 is variant by translating the plunger 44 along the axis 48, the plunger 44 partially delimiting the second cavity 40.

The plunger 44 may contain a first portion 56 and a second portion 60, as shown in FIG. 1. The first portion 56 and the second portion 60 are fixedly secured together to move as a single unit. The first portion 56 is in fluid contact with the working fluid and the second portion 60 is in fluid contact with the control fluid. The second portion forms a seal with the interior surface of the hydraulic actuator 36. The second portion 60 may have a cross-sectional area perpendicular to the axis 48 that is greater than a cross-sectional area of the first portion 56. This dissimilarity in cross-sectional area provides a pressure ratio across the plunger 44. Therefore, a relatively large change in pressure of the working fluid within the first cavity 32 translates into a relatively small change in pressure of the control fluid within the second cavity 40. Alternatively, the first portion 56 and the second portion 60 can have the same cross-sectional area perpendicular to the axis 48, thereby utilizing a pressure ratio of one across the plunger 44. Additionally, both cavities 32, 40 may be part of a single chamber, with the plunger 44 partially delimiting each cavity 32, 40.

A control valve 64 is provided in fluid communication with the second cavity 40, operable to selectively establish fluid communication between the second cavity 40 and one of a pressurized control fluid source 68 and a low pressure tank or reservoir 70. The control fluid source 68 is pressurized at or above the maximum system pressure which may be experienced by the working fluid (factoring in any pressure ratio of the plunger 44). The low pressure reservoir 70 may be at atmospheric pressure. The control valve 64 may be configured to transition between an open position and a closed position, or may be configured to selectively open at various intervals between fully open and fully closed. The control valve 64 is electrically controlled via a control unit 72.

Figure 6:
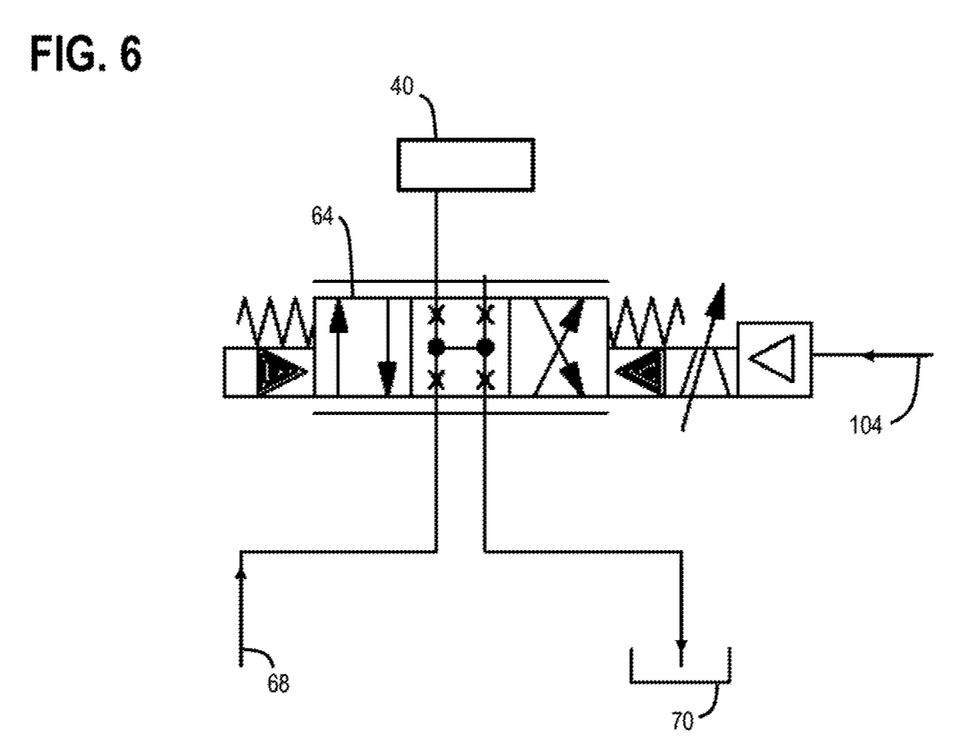
FIG. 6 is a schematic embodiment of the control valve of FIG. 1.

The control valve 64 may be a hydraulic control valve, such as the control valve 64 shown in FIG. 6. In a first position, the hydraulic control valve 64 places the second cavity 40 in fluid communication with the pressurized control fluid source 68. In a second position, the hydraulic control valve 64 places the second cavity 40 in fluid communication with the low pressure tank or reservoir. The hydraulic control valve 64 is electronically actuated between the first and second positions via an output signal 104 from the control unit 72.

The control unit 72 receives inputs from multiple sensors 76, 80, 84. A position sensor 84 is located within either the first cavity 32 or the second cavity 40 and is configured to collect position data representative of back-and-forth movement of the plunger 44. A first pressure sensor 76 is located within the conduit 28 and is configured to measure the pressure of the working fluid within the conduit 28. A second pressure sensor 80 is located within the second cavity 40 and is configured to measure the pressure of the control fluid within the second cavity 40.

Figure 5:
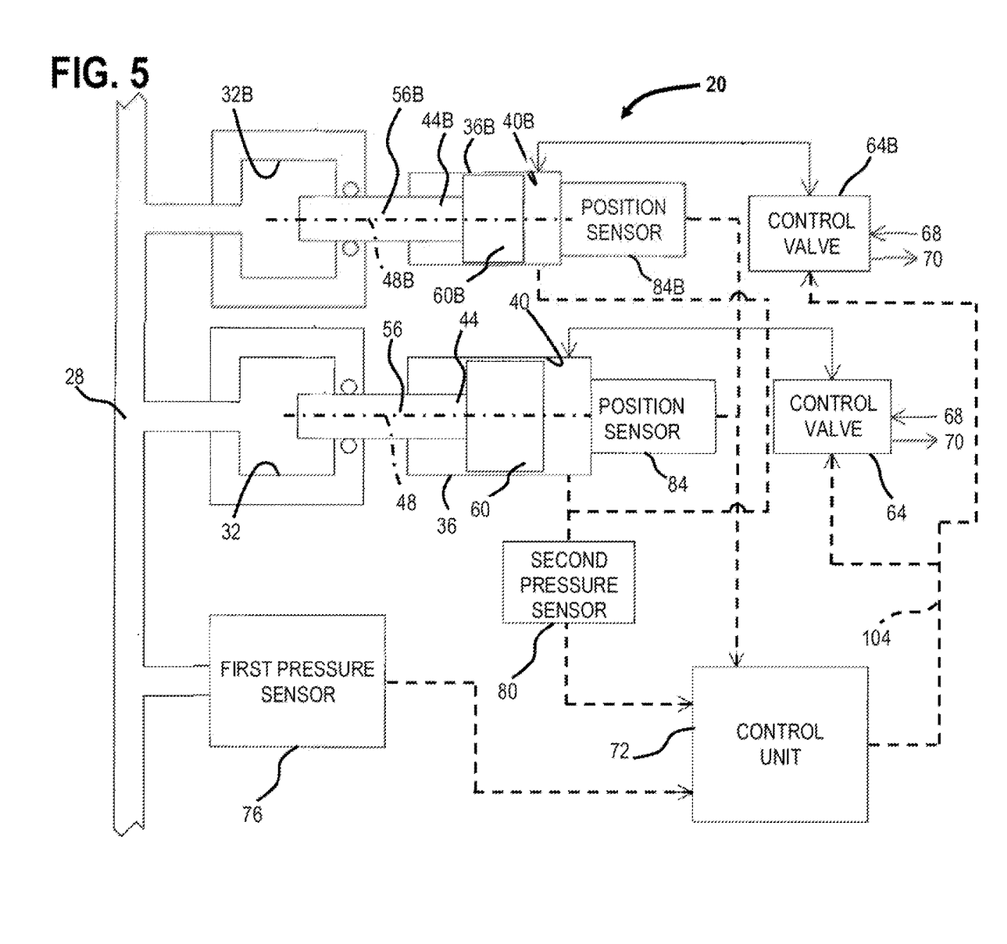
FIG. 5 is a schematic diagram of a dampening system with two actuators for dampening a working fluid within a conduit

While shown with only a single plunger 44 in a single hydraulic actuator 36 in FIG. 1, multiple plungers 44 corresponding to multiple actuators 36 may be in selective fluid communication with the conduit 28. An example of this is shown in FIG. 5, where two actuators 36, 36B, each contain a separate plunger 44, 44B respectively. Similar components, which may differ from the components of FIG. 1 in size and shape, are denoted with a "B". The plunger 44B of the second actuator 36B may be considered a second plunger and the two cavities 32B, 40B of the second actuator 36B may be considered third and fourth cavities respectively. The second actuator 36B may be in fluid communication with the control fluid via a second control valve 64B, as shown in FIG. 5, or via additional channels within the control valve 64. The multiple plungers 44, 44B may have various cross-sectional areas or pressure ratios such that various pressure ranges may be accommodated in a single dampening system 20. The plungers 44, 44B may be used simultaneously with one another, or may be used individually.

Figure 2:
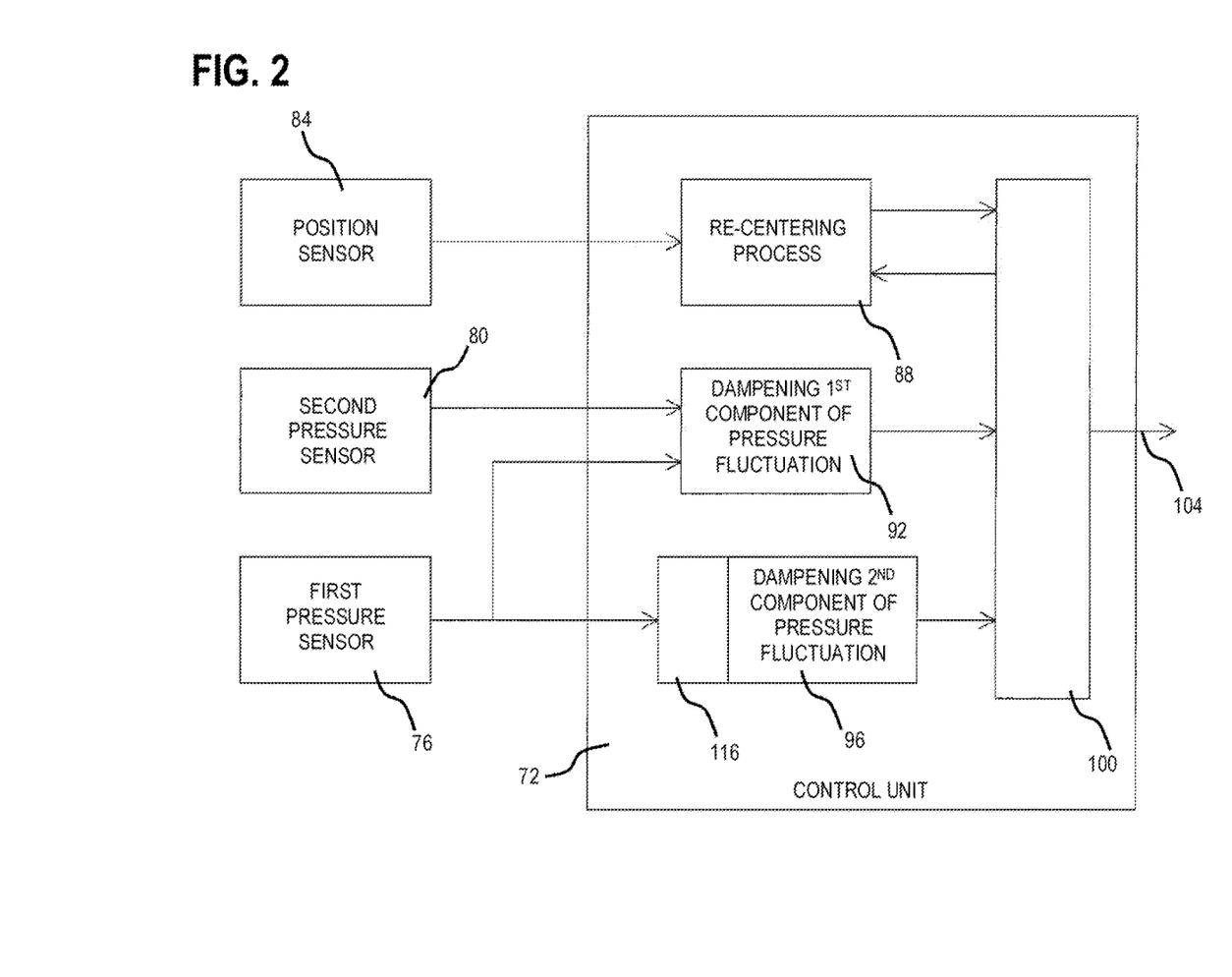
FIG. 2 is a schematic flow diagram detailing a plurality of inputs to a control unit and a single cumulative output.

As shown in FIG. 2, the various sensors 76, 80, 84 provide inputs to the control unit 72, which are then analyzed such that the control unit 72 can determine a reaction for dampening pressure fluctuations within the conduit 28. The position sensor 84 provides inputs to the control unit 72 for a re-centering process 88. The re-centering process 88 includes re-centering the plunger 44 relative to a center position in which available plunger displacement is equal in both directions. A process 92 of dampening a first component of a pressure fluctuation utilizes the first and second pressure sensors 76, 80 to collectively provide inputs to the control unit 72 and account for a first component of the pressure fluctuation. The first pressure sensor 76 provides an input to the control unit 72 to account for a second component of the pressure fluctuation, the second component of the pressure fluctuation having a higher frequency than the first component of the pressure fluctuation. The control unit 72 may include filters to remove noise from the signals from any or all of the sensors 76, 80, 84. As shown in FIG. 2, a filter 116 is provided with respect to the process 96 of dampening the second component of the pressure fluctuation.

The control unit 72 further includes a summation node 100 to which the output signals produced by the three processes 88, 92, 96 are provided as inputs and summed to create a single cumulative output signal 104. Each of the inputs to the summation node 100 may represent a positive value (i.e., requesting additional control fluid in the second cavity 40), a negative value (i.e., requesting removal of control fluid from the second cavity 40), or may be neutral (i.e., requiring no addition or removal of fluid from the second cavity 40) at any given time, depending on the nature of the pressure change, if any, in the working fluid within the conduit 28. The output signal 104 from the summation node 100 is sent from the control unit 72 to the control valve 64 to change the amount of the control fluid within the second cavity 40. If the cumulative output signal 104 requires additional control fluid to be provided to the second cavity 40 to urge the plunger 44 towards the first cavity 32, the control valve 64 establishes fluid communication between the second cavity 40 and the high pressure supply 68. If the cumulative output signal 104 requires control fluid be removed from the second cavity 40 to urge the plunger 44 towards the second cavity 40, the control valve 64 establishes fluid communication between the second cavity 40 and the low pressure reservoir 70.

Figure 3:
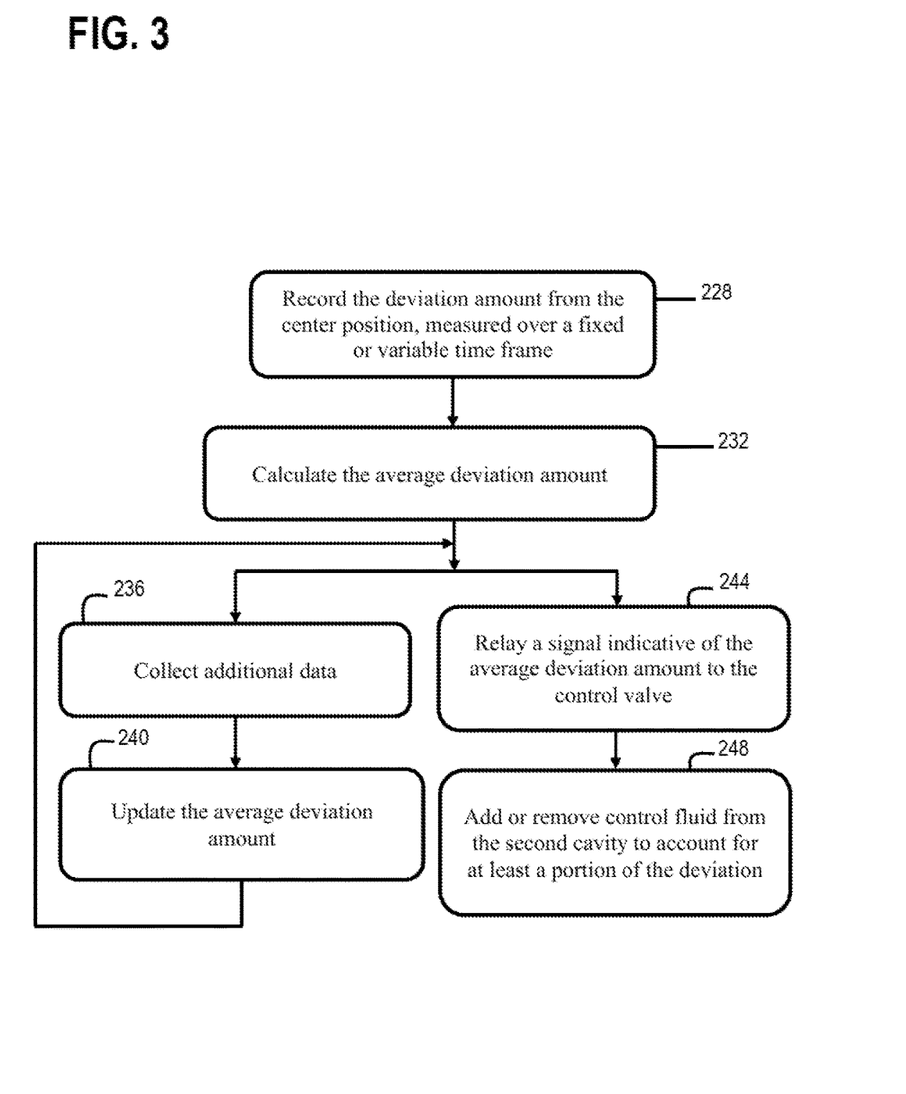
FIG. 3 is a flow chart of a plunger re-centering method.

The process 88 of re-centering the plunger 44 relative to the center position includes a first step 228 of recording the deviation amount from the center position. The deviation amount is the distance between the current position of the plunger 44 and the center position and is measured over a fixed or variable time frame. A number of deviations may need to be considered prior to proceeding to step 232, and can be set within the control unit 72, without any human interaction. Alternatively, a human input can vary the number of deviations to be considered. The position sensor 84 is used to measure the position of the plunger 44 over the elapsed time. More specifically, this may include measuring the deviation amount of the plunger 44 from the center position or measuring the absolute position of the plunger 44 from a limit position. Once a number of deviations have been measured or an amount of time has passed, the average deviation amount is calculated by the control unit 72 at step 232.

At steps 236 and 240, a recurring loop begins which updates the average deviation amount to include an additional measurement and ignore the oldest averaged measurement. Simultaneously, at step 244, a signal indicative of the average deviation amount is relayed to the control valve 64. At step 248, the control valve 64 communicates with either the supply 68 or the reservoir 70 to account for at least a portion of the average deviation amount of the plunger 44 from the center position and urge the plunger 44 toward the center position. Alternatively, a signal does not need to be relayed to the control valve 64 at step 244 every time the average deviation amount is updated at step 240.

The process 92 of dampening the lower frequency, first component of the pressure fluctuation utilizes outputs from both the first pressure sensor 76 and the second pressure sensor 80. The first pressure sensor 76, located within the conduit 28, measures the pressure of the working fluid within the conduit 28 and relays a signal indicative of this pressure to the control unit 72. The pressure of the working fluid is measured to create an average working fluid pressure. This average working fluid pressure is routinely updated. The second pressure sensor 80, located in the second cavity 40, measures the pressure of the control fluid within the second cavity 40 and relays a signal indicative of this pressure to the control unit 72. The pressure of the control fluid changes as pressure fluctuations within the conduit 28 influence the plunger 44.

The control unit 72 compares the pressure of the control fluid measured with the second pressure sensor 80 to the average working fluid pressure measured with the first pressure sensor 76. If a discrepancy exists between the pressure and the average pressure, the control unit 72 instructs the control valve 64 to counteract the discrepancy by varying the quantity of control fluid within the second cavity 40 to simulate a perfect spring. The simulated spring provides compliant control of the working fluid. If the second cavity 40 requires additional control fluid to urge the plunger 44 to reduce the volume of the working fluid in the first cavity 32, the control valve 64 establishes fluid communication between the second cavity 40 and the high pressure supply 68. If control fluid must be removed from the second cavity 40 to allow additional working fluid into the first cavity 32, the control valve 64 establishes fluid communication between the second cavity 40 and the low pressure reservoir 70.

In a hydraulic actuator, the response time is limited by a number of physical attributes (i.e., mass of the plunger and process fluid 44, stiffness or bulk modulus of the process and control fluid). The plunger 44 and the process and control fluid comprise a mass-spring system which has a given natural frequency or resonance, which results in a physical limitation to the response speed of the actuator 36. Using a hydraulic actuator 36, in a pressure control operation, the effects of mass are not a factor in the response time.

A low-frequency component of the pressure fluctuations (i.e., pressure fluctuations below a certain threshold), which often have greater magnitudes than a high-frequency component of the pressure fluctuations, may not be efficiently dampened by the process 96. The goal of the process 92 is to maintain a pressure which matches any change in pressure of the working fluid; however, this may only be effective to dampen pressure fluctuations at or below a certain threshold frequency, which may vary based on the system pressure and the deviations in pressure achievable by the working fluid. Therefore, the high-frequency component of the pressure fluctuations is actively dampened with the second process 96 which may operate simultaneously with the compliant first process 92.

The process 96 of dampening the second component of the pressure fluctuation utilizes outputs from only the first pressure sensor 76, located within the conduit 28. The second component of the pressure fluctuation is the high-frequency component of the pressure fluctuation (e.g., greater than 1 Hz, greater than 5 Hz, greater than 10 Hz, greater than 20 Hz, etc.) relative to the first component of the pressure fluctuation. In order to effectively dampen the high-frequency component of the pressure fluctuation, the plunger 44 actively opposes the change in pressure of the working fluid. The high-frequency component may be a harmonic oscillation caused by a cyclic process that affects the working fluid within the conduit 28. If the second cavity 40 requires additional control fluid to urge the plunger 44 to reduce the volume of the working fluid in the first cavity 32, the control valve 64 establishes fluid communication between the second cavity 40 and the high pressure supply 68. If control fluid must be removed from the second cavity 40 to allow additional working fluid into the first cavity 32, the control valve 64 establishes fluid communication between the second cavity 40 and the low pressure reservoir 70.

The second dampening process 96 may analyze the characteristics of an impulse, measured by the first pressure sensor 76, located within the conduit 28. Using mathematical functions (i.e., Fourier transforms), the frequency of a cyclic or a non-cyclic low-frequency pressure fluctuation may be derived.

Figure 4:
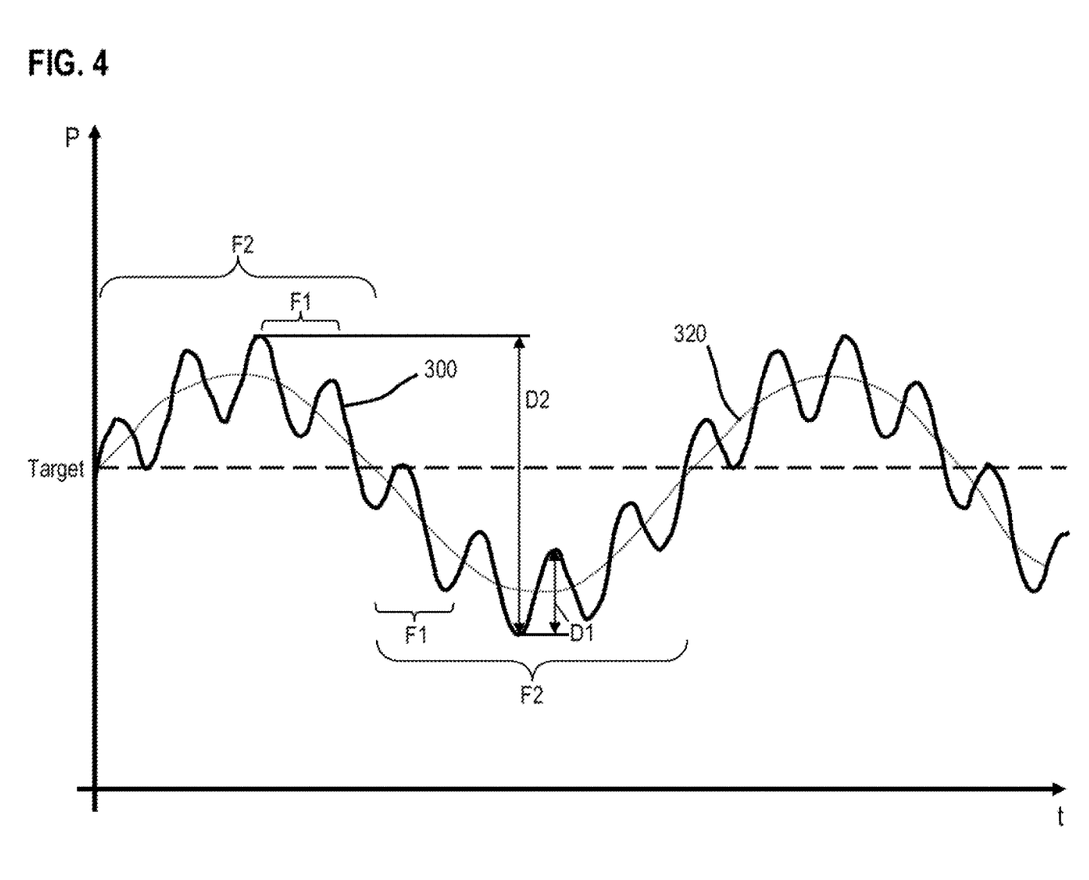
FIG. 4 is a pressure versus time plot illustrating a representative pressure fluctuation.

FIG. 4 shows a representative un-damped pressure fluctuation 300 over an amount of time. The dampening system 20 limits or eliminates the deviation of the pressure of the working fluid from the steady target pressure. The first component F2 of the pressure fluctuation 300 is the low-frequency component and the second component F1 of the pressure fluctuation 300 is the high-frequency component. As shown, the first component F2 has a greater pressure amplitude D2 than the pressure amplitude D1 of the first component F1. The process 92 of dampening the first component F2 of the pressure fluctuation 300, as shown in FIG. 4, removes the first component F2, leaving the second component F1 of the pressure fluctuation 300, a high-frequency pressure fluctuation 320. The process 96 of dampening the second component F1 of the pressure fluctuation 300, as shown in FIG. 4, removes the high frequency pressure fluctuation 320, the second component F1. Collectively and simultaneously, the first process 92 and the second process 96 effectively dampen the pressure fluctuation 300, providing a constant pressure output. Further, the process 88 of re-centering the plunger 44 can be implemented if the constant pressure output varies from the target pressure.

Multiple pressure fluctuation modes having different frequencies may be transmitted through the working fluid simultaneously, an example of which is shown in FIG. 4.

Therefore, the control unit 72 is configured to analyze the re-centering process 88, the first dampening process 92, and the second dampening process 96 simultaneously, such that a single, cumulative output 104 is produced at a summation node 100. The single, cumulative output 104 is relayed to the control valve 64 to simultaneously dampen multiple frequency ranges within a pressure fluctuation, above and below the threshold, while actively re-centering the plunger 44. Alternatively, the dampening processes 92, 96 may produce a single, cumulative output separate from the re-centering process 88.

The dampening processes 92, 96 may be more quickly completed by the control unit 72 than the re-centering process 88. Therefore, while the control unit 72 may send a signal to correct the dampening processes 92, 96 in a short amount of time (e.g., less than ten milliseconds, less than one hundred milliseconds, less than one second, etc.), the process of re-centering 88 may be carried out over a longer amount of time (e.g., at least ten seconds, at least twenty seconds, at least thirty seconds, at least an order of magnitude longer than the amount of time required for the dampening processes 92, 96, etc.).

What is claimed is:

1. A method of actively compensating for pressure changes of a working fluid within a conduit, the method comprising:
    providing a first cavity in fluid communication with the conduit, a second cavity in fluid communication with a control fluid, and a plunger in communication with both the first cavity and the second cavity and movable in response to pressure changes of the working fluid in the conduit;
    controlling the flow of the control fluid into and out of the second cavity with a control valve; and
    re-centering the plunger to maximize the plunger travel available for compensation of pressure changes of the working fluid in the conduit, the re-centering including:
        collecting position data representative of the movement of the plunger over an elapsed time period,
        analyzing the position data with a control unit to determine an average position of the plunger which is offset relative to a center position in which available plunger displacement is equal in both directions,
        comparing, with the control unit, the average position of the plunger to the center position, and
        relaying a re-centering signal from the control unit to the control valve to urge the plunger toward the center position.

2. The method of claim 1, further comprising:
    providing a position sensor in one of the first cavity and the second cavity,
    wherein collecting position data of the plunger relative to the center position includes measuring the location with the position sensor.

3. The method of claim 1, further comprising repeating the re-centering steps for an additional elapsed time period.

4. The method of claim 1, further comprising operating the control valve to dampen a pressure pulsation within the working fluid, wherein a time period required for dampening the pressure pulsation is at least an order of magnitude less than a time period for re-centering the plunger.

5. The method of claim 1, further comprising, measuring a pressure pulsation within the working fluid and, prior to relaying the re-centering signal from the control unit to the control valve, modifying the re-centering signal to simultaneously dampen the pressure pulsation and urge the plunger toward the center position.

6. The method of claim 5, wherein the first cavity, the second cavity, and the plunger form a first actuator and further comprising a second actuator including a third cavity, a fourth cavity, and a second plunger, the method further comprising:
    providing the third cavity in fluid communication with the conduit, the fourth cavity in fluid communication with the control fluid, and the second plunger in communication with both the third cavity and the fourth cavity and movable in response to pressure changes of the working fluid in the conduit;
    relaying the pressure of the working fluid to the control unit,
    wherein the control unit selects the first actuator to dampen the pressure pulsation.

7. The method of claim 1, wherein the plunger is movable along an axis, the plunger comprising a first portion in fluid communication with the working fluid and a second portion in fluid communication with the control fluid, the second portion defining a cross-sectional area greater than a cross-sectional area of the first portion.

\* \* \* \* \*